J. W. Hull,
Hay Fork.

No. 103,192.  Patented May 17, 1870.

Witnesses:
Joh. Becker
L. S. Mabee.

Inventor:
J. W. Hull
per Munn & Co
Attorneys.

United States Patent Office.

JOHN W. HULL, OF CONNERSVILLE, INDIANA.

Letters Patent No. 103,192, dated May 17, 1870.

IMPROVEMENT IN HORSE HAY-FORKS.

The Schedule referred to in these Letters Patent and making part of the same

*To all whom it may concern:*

Be it known that I, JOHN W. HULL, of Connersville, in the county of Fayette and State of Indiana, have invented a new and improved Horse Hay-Fork; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
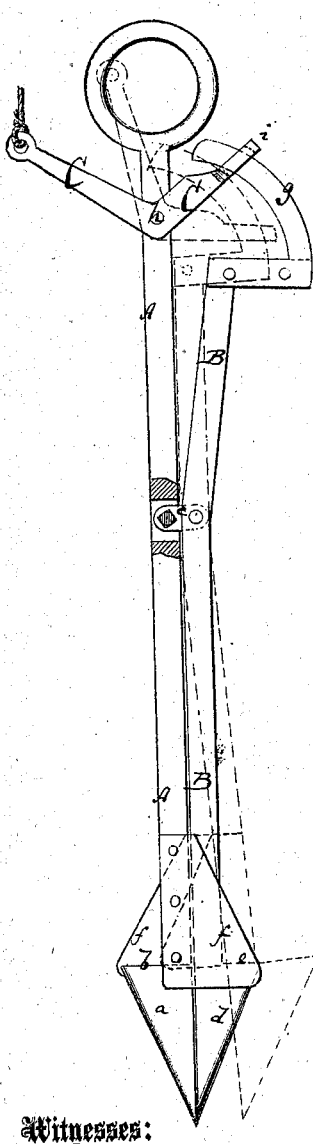
Figure 1 represents a front view, partly in section, of my improved horse hay-fork.
Figure 2:
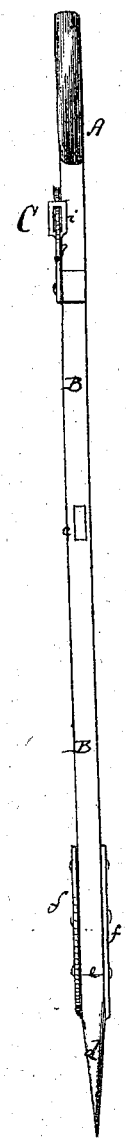
Figure 2 is an edge view of the same.

This invention relates to a new horse hay-fork of very simple construction. It combines the advantages of the ordinary pronged fork with those of the harpoon, by so constructing the projecting prongs or ears of my fork that they will be concealed, like harpoons, when the load is to be discharged.

A in the drawing represents the shank or main handle of my improved fork. Its lower end carries a triangular prong or ear, *a*, which projects from one side of the shank, forming at its upper end a supporting-shoulder, *b*, as shown.

To about the middle of the shank A is, by means of a projecting lug or link, *c*, connected with the same the shank B of the second prong or ear *d*. This ear projects from the shank B, so as to stand opposite to *a*, and forms the second supporting-shoulder *e*.

The shank B is not quite straight, but forms an obtuse angle at the place where it connects with the shank A, as shown. When its upper part is laid flat against A, its lower part projects away from the same, as indicated by dotted lines, and *vice versa*.

From both shanks project, opposite to their prongs, and in line with the supporting-shoulders of the same, shields *f f*, which are, preferably, sheet-metal plates, which overlap the supporting-edges on the opposite prongs, respectively. The fork can then be forced into the hay, and, when in sufficiently far, the upper ends of the shanks are brought together, to spread the prongs apart. The shoulders *b e* will, when the fork is hoisted in this position, carry up the necessary quantity of hay.

When the hay is to be dumped, the prongs are forced together by bringing the upper ends of their shanks apart, and thereby the shoulders *b e* are carried under the shields, which will clear them of their loads.

The shank B carries, at its upper end, a curved plate, *g*, which is eccentric to the pivot *h* of a lever, C, pivoted to A.

An arm, *i*, of the lever C, embraces the plate *g*.

By swinging the lever C on its pivot, the prongs can be brought together or apart.

Having thus described my invention,

I claim as new and desire to secure by Letters Patent—

1. The lever C, angled at the point shown in fig. 1 of drawing, combined with straight rod A, each having a shield and an angular prong at its lower end, each constructed, arranged, and operated as and for the purpose specified.

2. The ears *a d*, having the shape of right-angled triangles, combined with correspondingly-shaped shields *f f*, all constructed, operated, and relatively arranged as and for the purpose described.

The above specification of my invention signed by me this 25th day of January, 1869.

JOHN W. HULL.

Witnesses:
F. A. HANSON.
J. A. HANSON.